US012613351B2

(12) United States Patent
Dinh

(10) Patent No.: US 12,613,351 B2
(45) Date of Patent: Apr. 28, 2026

(54) FULL WAVEFORM INVERSION METHOD AND APPARATUS USING UNSUPERVISED MACHINE LEARNING

(71) Applicant: CGG SERVICES SAS, Massy Cedex (FR)

(72) Inventor: Nho Hùng Dinh, Crawley (GB)

(73) Assignee: CGG SERVICES SAS, Massy Cedex (FR)

( * ) Notice: Subject to any disclaimer, the term of this patent is extended or adjusted under 35 U.S.C. 154(b) by 1386 days.

(21) Appl. No.: 17/099,878

(22) Filed: Nov. 17, 2020

(65) Prior Publication Data

US 2021/0270982 A1 Sep. 2, 2021

Related U.S. Application Data

(60) Provisional application No. 62/983,980, filed on Mar. 2, 2020.

(51) Int. Cl.
| | |
|---|---|
| *G01V 1/28* | (2006.01) |
| *G01V 1/34* | (2006.01) |
| *G06F 30/27* | (2020.01) |
| *G06F 111/10* | (2020.01) |

(52) U.S. Cl.
CPC .............. *G01V 1/282* (2013.01); *G01V 1/345* (2013.01); *G06F 30/27* (2020.01); *G06F 2111/10* (2020.01)

(58) Field of Classification Search
CPC .... G01V 1/282; G01V 1/345; G01V 2200/14; G06F 30/27; G06F 2111/10
See application file for complete search history.

(56) References Cited

U.S. PATENT DOCUMENTS

| | | | | |
|---|---|---|---|---|
| 2016/0033661 A1* | 2/2016 | Bansal | ................... | G01V 1/306 |
| | | | | 703/2 |
| 2016/0320505 A1* | 11/2016 | D'Afonseca | ........... | G01V 1/303 |
| 2021/0026028 A1* | 1/2021 | Thorne | ................. | G01V 1/301 |

OTHER PUBLICATIONS

Zhang et al. "Enhanced Velocity Modelling and Imaging in the North Sea Using Well Constrained Full Waveform Inversion." In 77th EAGE Conference and Exhibition 2015, vol. 2015, No. 1, pp. 1-5. European Association of Geoscientists & Engineers, 2015. (Year: 2015).*
Ullah et al. "Improving the spatial resolution of ground motion variability using earthquake and seismic noise data: The example of Bishkek (Kyrgyzstan)." Bulletin of Earthquake Engineering 11 (2013): 385-399. (Year: 2013).*
Alejo Martinez-Sansigre et al., "A probabilistic QC for cycle-skipping in full waveform inversion," SEG Denver 2014 Annual Meeting, pp. 1105-1109.

(Continued)

*Primary Examiner* — Eunhee Kim
(74) *Attorney, Agent, or Firm* — PATENT PORTFOLIO BUILDERS PLLC

(57) ABSTRACT

A quality control method and apparatus generate maps for cycle skipping analysis of velocity models that may be the input or the output of a full waveform inversion. A comparison of observed data and corresponding synthetic data generated using a candidate velocity model yields feature images of shots. The feature images are then grouped in clusters using unsupervised machine learning. Deviation of the feature images from an ideal non-cycle skipped image allows to measure the quality of the candidate velocity model.

17 Claims, 15 Drawing Sheets

(56) References Cited

OTHER PUBLICATIONS

David Brown, "The Oil Industry's Cyber-Transformation is Closer Than You Think," Insights America Association of Petroleum Geologists, AAPG, Jun. 2019, pp. 1-13.

Ghassan Alregib et al., "Subsurface Structure Analysis using Computational Interpretation and Learning: A Visual Signal Processing Perspective," IEEE Signal Processing Magazine, Mar. 12, 2018, pp. 82-98 (1-21), vol. 35, No. 2.

J. Macqueen, "Some methods for Classification and analysis of multivariate observations" Proceedings of 5th Berkeley Symposium of Mathematical Statistics and Probability, 1967, pp. 281-297, vol. 1.

Kari Johnson, "Seismic Computing, Advances Opening New Possibilities," The American Oil and Gas Reporter, Nov. 2015, pp. 1-9.

M. Chambefort, "Leveraging a Supervised Machine Learning Toolkit For Better Seismic Processing Quality Control," Th_R11_13, European Association of Geological of Geoscientists and Engineers, 81st EAGE Conference & Exhibition 2019, Jun. 3-6, 2019, London, UK, 5 pages.

Stuart P. Lloyd et al., "Least squares quantization in PCM," IEEE Transactions on Information Theory, Mar. 1982, pp. 129-137, vol. 28, No. 2.

* cited by examiner

START

1001

The k-means clustering algorithm is run on feature images with increasing number of clusters, k, to determine an operative value of k

1002

Selecting the operative value of k, the number of clusters

1003

Calculating a class map for the entire survey area for the selected k value, and a centroid of the non-cycle skipping cluster

STOP

LEGEND non-cycle-skipping shallow mismatch at near offset deep/late mismatch at far offset mismatch at both near- and far-offset

1500

FULL WAVEFORM INVERSION METHOD AND APPARATUS USING UNSUPERVISED MACHINE LEARNING

TECHNICAL FIELD

Embodiments of the subject matter disclosed herein generally relate to Full Waveform Inversion (FWI) methods and systems that perform quality control on candidate velocity models.

DISCUSSION OF THE BACKGROUND

Oil and gas industry exploration has matured in the high-performance computing era. As discussed in the article "Seismic Computing" by K. Johnson published in The American Oil and Gas Reporter of Aug. 4, 2020, two factors in seismic data processing are particularly valued: turnaround time and processing quality (Johnson, 2015). In order to optimize these factors, parallel computation is increasingly used, especially in seismic migration and modelling. High-capacity processing resources and optimized algorithms provide faster and higher accuracy processing results. As seismic processing and its quality control (QC) are inextricably linked, improving the subsequent QC process has to match advances achieved in seismic data processing.

Full Waveform Inversion (FWI) is a seismic data processing method that updates a candidate velocity model with high spatial resolution. A problem impacting quality in FWI is cycle skipping, which is a mismatch of a half cycle or more between the observed seismic data and corresponding synthetic seismic data generated using the candidate velocity model. Over a large area, a small-scale improvement is challenging to examine. Conventionally, QC associated with FWI consumes time and human effort, thereby significantly increasing turnaround time. Human evaluation is also subjective and may not be consistent in time.

In 2014, Martinez-Sansigre and Ratcliffe (i.e., the article "A probabilistic QC for cycle skipping in Full waveform inversion" published in 84th SEG Annual International Meeting, Expanded Abstracts, pp. 1105-1109) introduced a probabilistic cycle skipping, PCS, attribute for each trace in a gather. The PCS attribute estimates time shifts at trace-level, which is an approach ineffective in identifying a shot-level cycle skip, thus, not being able to fully represent the characteristics of cycle skipping in the data. Resizing a feature from a 2D shot to a 1D attribute removes useful spatial and temporal information such as correlations that help to discriminate between shot-level cycle skipping and a trace-level cycle skipping. Production projects have shown that this method is not reliable and misses cycle skipping regularly.

Machine learning (ML) has lately been employed in seismic data processing for replacing repetitive tasks with machines and for self-discovering the characteristics of the big data (as discussed, for example, in the article "The oil industry's cyber-transformation is closer than you think" by D. Brown, published in the America Association of Petroleum Geologists, AAPG, June 2019 Technology Issue). Supervised machine learning (SML) is used, for example, in geological feature detection (as discussed in the 2018 article "Subsurface structure analysis using computational interpretation and learning: A visual signal processing perspective" by AlRegib, G. et al., published in *IEEE Signal Processing Magazine*, Vol. 35, No. 2, pp. 82-98). Regarding FWI QC, a previous SML approach using k-nearest-neighbor algorithm (KNN) was introduced by Chambefort, M. et al. in the 2019 article "Leveraging a supervised machine learning toolkit for better seismic processing quality control" published in the European Association of Geological of Geoscientists and Engineers, EAGE, Conference, Expanded Abstracts. However, due to the laborious nature of labeling the training data, SML is not suitable for production.

Thus, there is a need to propose methods and systems that overcome the drawbacks and limitations of conventional approaches to QC FWI. All the articles mentioned in the background section are incorporated by reference in their entirety.

SUMMARY

Methods and apparatuses according to various embodiments perform a quality control of candidate velocity models. Feature images flagging cycle-skipping within shot-illuminated areas are grouped using an unsupervised machine learning (UML) algorithm. This approach has the advantage that no training is necessary. Various types of problematic zones may be gradually identified and eliminated by enhancing the velocity model (i.e., the candidate model update in the FWI may be guided via constraints or weights to address local problems).

According to an embodiment there is a quality control method for velocity models of a subsurface formation. The method includes obtaining observed seismic data acquired over the subsurface formation, and corresponding synthetic data prepared using a candidate velocity model of the subsurface formation. The method further includes generating feature images, wherein a targeted feature is cycle skipping flagged based on differences between the observed seismic data and the corresponding synthetic data. The method then includes applying a k-means clustering algorithm to the feature images and generating a class map based on k clusters and centroids thereof, wherein the k clusters include a non-cycle skipped cluster, and generating a cycle-skipping risk map representing a cycle-skipping quality of the candidate velocity model based on differences between feature images and a centroid of the non-cycle skipped cluster.

According to an embodiment there is a seismic data processing apparatus configured to perform quality control for velocity models of a subsurface formation. The apparatus has an interface configured to obtain observed seismic data acquired over the subsurface formation. The apparatus also has a processor connected to the interface and configured: (1) to prepare synthetic data corresponding to the observed seismic data, using a candidate velocity model of the subsurface formation; (2) to generate feature images, wherein a targeted feature is cycle skipping flagged based on differences between the observed seismic data and the corresponding synthetic data; (3) to apply a k-means clustering algorithm to the feature images and to generate a class map based on k clusters and centroids thereof, wherein the k clusters include a non-cycle skipped cluster; and to generate a cycle-skipping risk map representing a cycle-skipping quality of the candidate velocity model based on differences between feature images and a centroid of the non-cycle skipped cluster.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

As already mentioned, an SML approach using a KNN algorithm has been used in FWI QC for geological feature detection. The embodiments described in this section take a different approach, with unsupervised machine learning (UML) being used to understand the FWI quality better and to obtain QC FWI results faster. UML employs a k-mean clustering algorithm to study the characteristics of the cycle skipping and to measure the cycle skipping risk, thereby providing more discovery and insights into the data.

Figure 1:
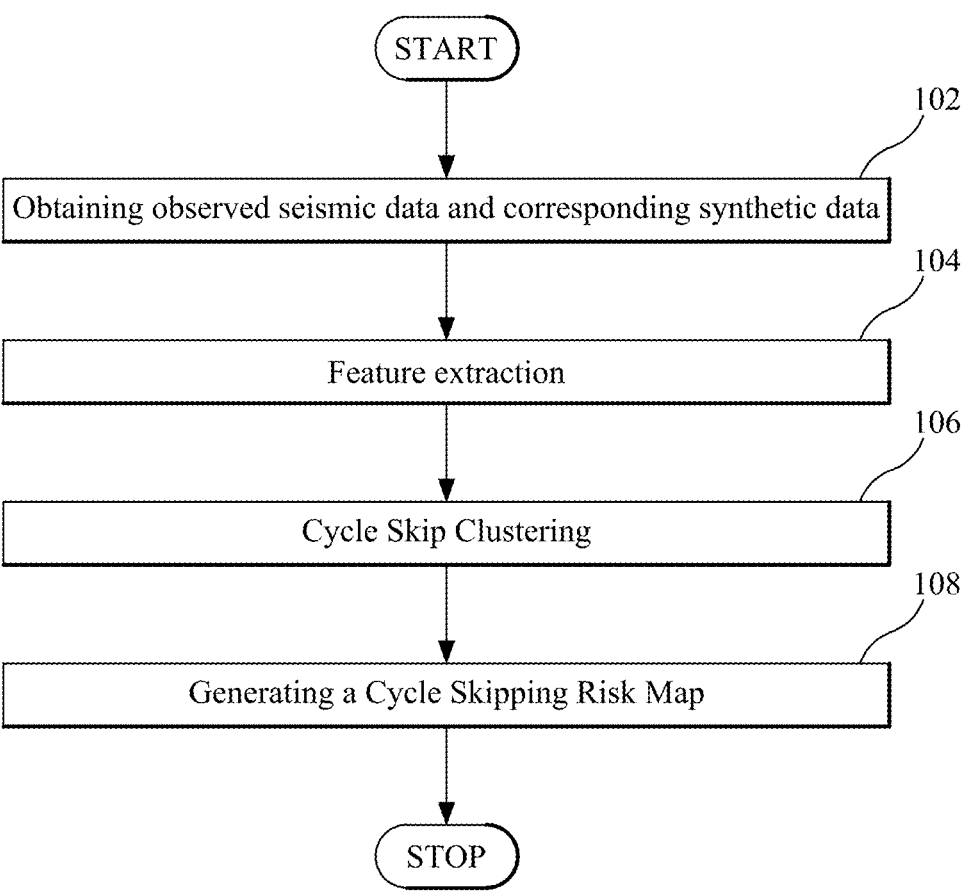
FIG. 1 is a flowchart of a method for quality control of FWI according to an embodiment.

FIG. 1 illustrates a flowchart of a method 100 for quality control of an FWI according to an embodiment. The method is associated with an FWI used to enhance a velocity model of the explored subsurface formation based on a comparison of synthetic data (generated using the model) with seismic data acquired over the subsurface formation. Here, the model provides three-dimensional (3D) structural information about the subsurface formation and may be updated in view of the differences between the observed and synthetic data while also taking into account other information and constraints besides the seismic wave velocity propagation (simpler called "velocity") values.

Method 100 starts with obtaining observed seismic data and corresponding synthetic data at 102. Cycle skipping of a candidate model in FWI is revealed by visualizing the difference (mismatch) between a computed waveform (i.e., synthetic data) and the observed waveform (i.e., acquired data). The observed seismic data carries information about the subsurface formation. This data may be acquired using a land seismic acquisition, a marine seismic acquisition or an ocean bottom seismic acquisition. The synthetic data corresponding to the observed seismic data is then prepared using a candidate velocity model of the subsurface formation. Method 100 assesses the cycle-skipping quality of the candidate velocity model.

Figure 2:
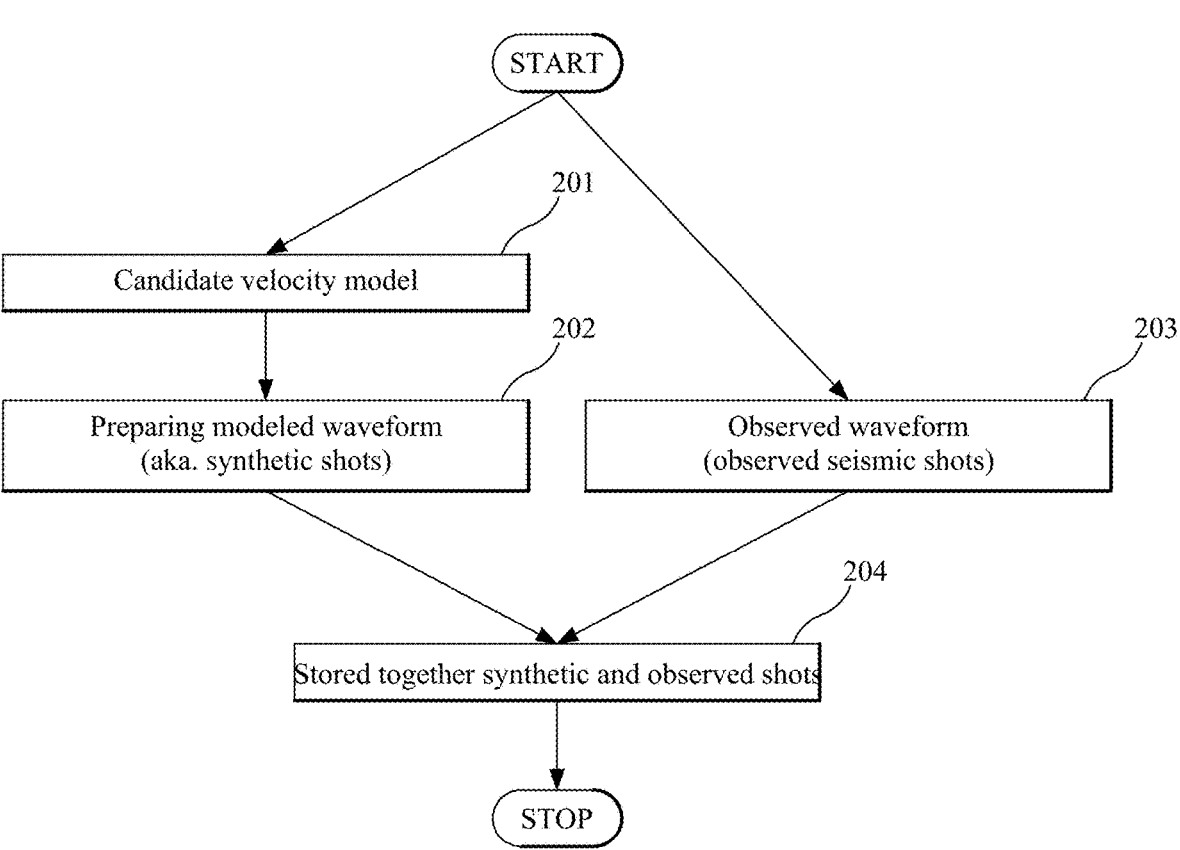
FIG. 2 details obtaining and preparing seismic data according to an embodiment.
Figure 3:
FIG. 3 is a graph illustrating sequentially (i.e., from left to right) overlaid observed seismic data and modeled data corresponding seven shots.

An embodiment of step 102 is illustrated in FIG. 2. A velocity candidate model input at 201 is used to prepare synthetic data at 202. The forward modeling (i.e., tracing wave propagation from source to receiver) is performed with a defined wavelet and settings matching those of the data acquisition employed in gathering the observed seismic data 203. Then, the observed and the synthetic data are preferably stored together at 204, in a manner that allows fast retrieval of corresponding observed and synthetic shots (i.e., enabling a single passthrough the stored data in later steps). FIG. 3 is a graph illustrating, from left to right, overlays of observed seismic data (black) and synthetic data (gray) corresponding to seven shots 310-370. Horizontal axis for each shot is offset representing the same 1-480 channels for all the shots and vertical axis is time in ms (milliseconds). The 1-480 channels correspond to offsets between 100 to 6100 m, each channel covering an interval of 12.5 m. A linear moveout correction has been applied to the data that represents only the diving wave energy (the upgoing energy being muted).

Figure 4:
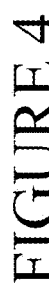
FIG. 4 is a graph illustrating feature images representing mismatches between observed seismic data and modeled data in FIG. 3.

Returning now to FIG. 1, at 104, feature images such as the ones illustrated in FIG. 4 are generated based on the observed and synthetic data/shots. In this step also known as "feature extraction", a feature image is generated for each shot. Here, the feature of interest is cycle skipping, that is, mismatches due to inaccuracies of velocity values. However, other features may also be targeted in such a feature analysis. The targeted features depend on the analysis objectives and the type of data analyzed. For example, feature extraction may target other features such as seismic interference noise and/or swell noise in a marine seismic data processing. In an amplitude versus offset (AVO) analysis, the targeted features may be anomaly distributions on intercept and gradient cross-plot. The feature extraction determines the clustering efficiency. The features are selected to represent/cover the maximum variance of information in the data. A principle component analysis, PCA, may be employed, but the components resulting from PCA are often not easily and intuitive to analyze or interpret. The mismatches between the observed and synthetic data shots are the features extracted for cycle skipping analysis.

FIG. 4 represents feature images obtained in step 104. These feature images 410-470 represent mismatches between the modeled and observed seismic data for the seven shots 310-370 in FIG. 3. The mismatches may occur both in depth/time and as a function of offset (i.e., distance between the seismic source and the receiver) in different horizontal locations across the survey area over the subsurface formation.

Figure 5:
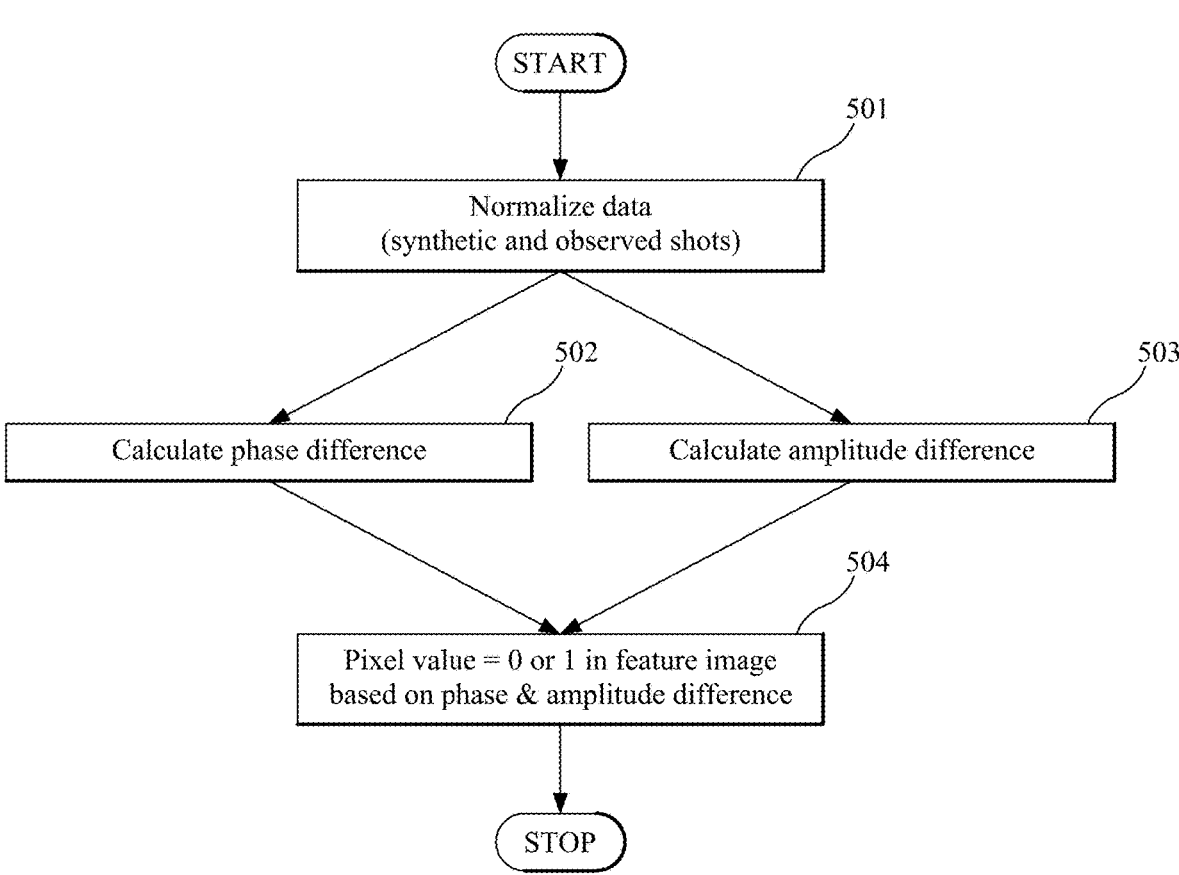
FIG. 5 is an embodiment of the feature extraction step according to an embodiment.
Figure 6:
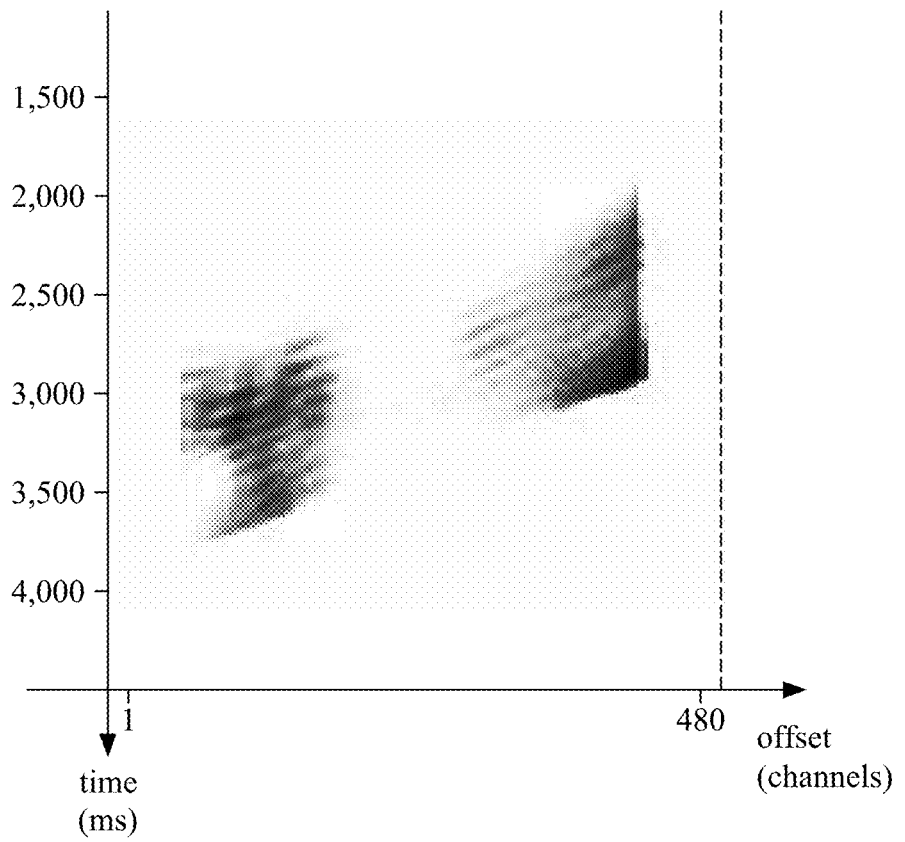
FIGS. 6 to 9 illustrate skipping classes' centroids according to an embodiment.
Figure 7:
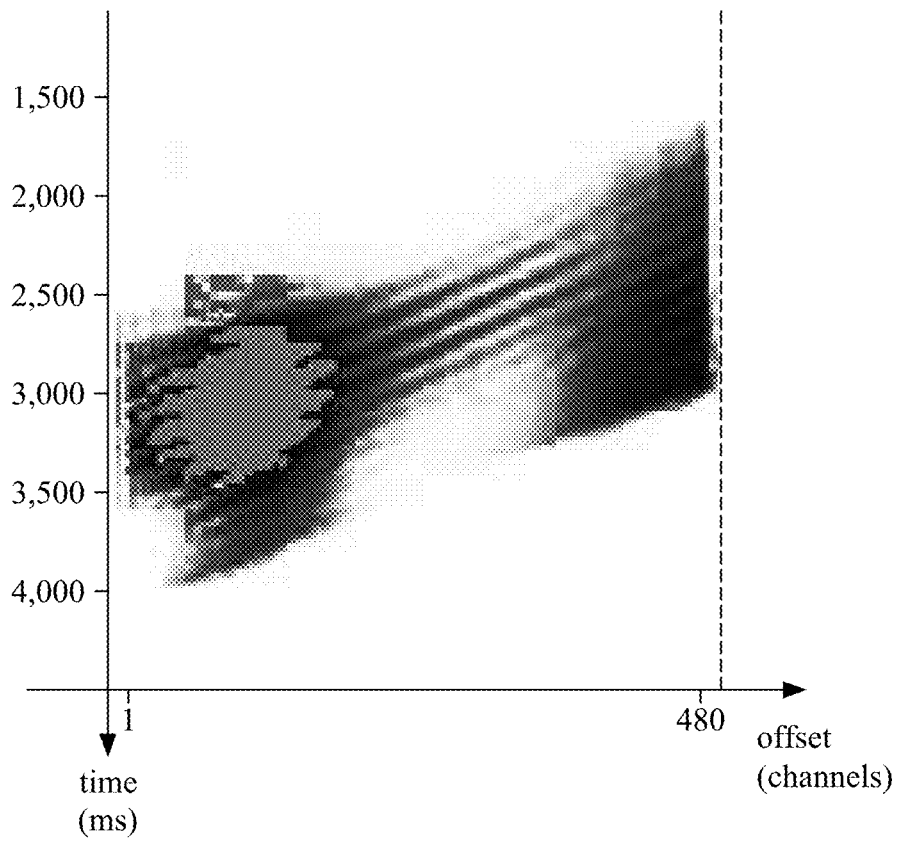
Figure 8:
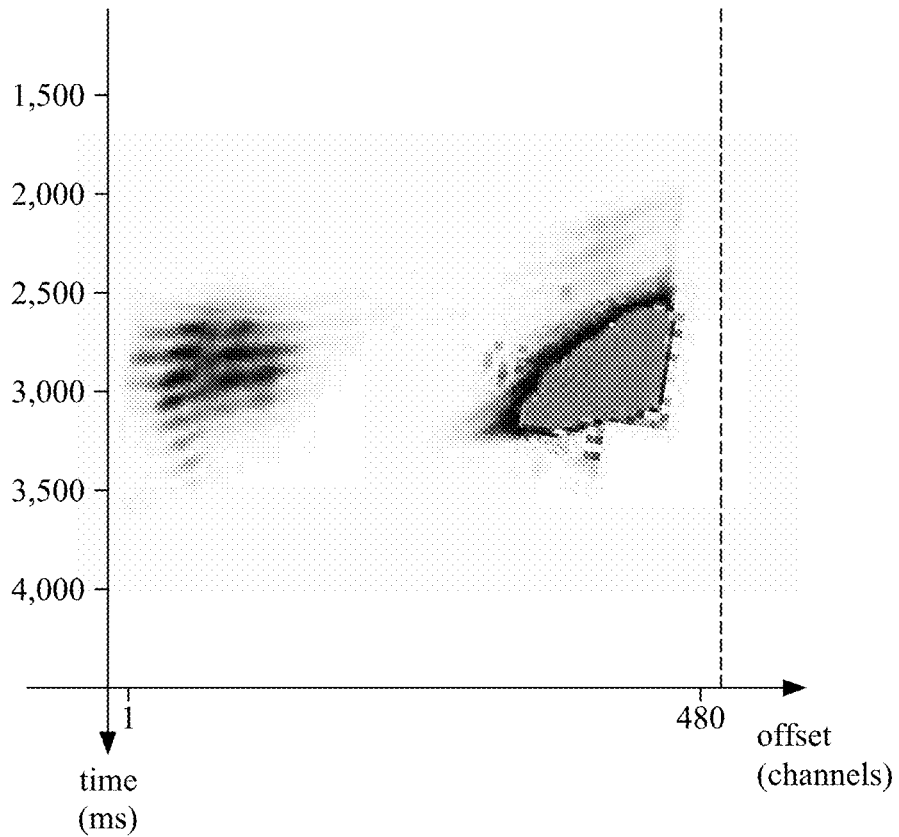
Figure 9:
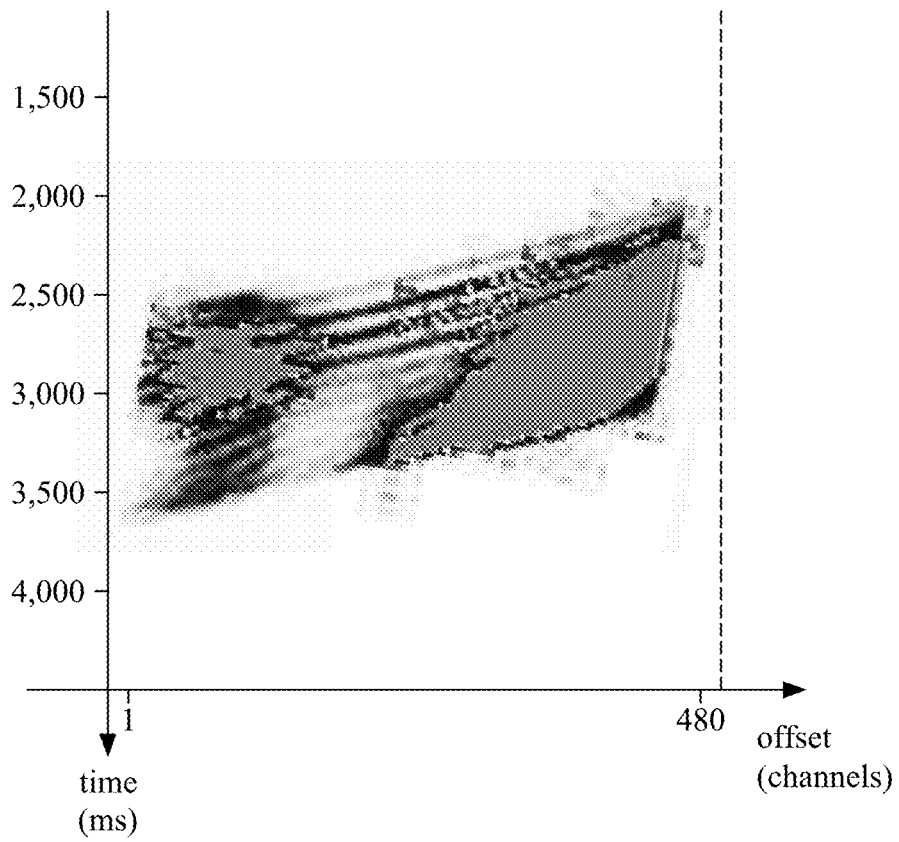

An embodiment of feature extraction step 104 is illustrated in FIG. 5. First, a Z-score data normalization is calculated at 501. For example, each time sample $d_{synt}$ of the synthetic data synt is normalized to $d_{synt}^*$ as follows:

$$d_{synt}^* = \frac{d_{synt} - E(synt)}{\sigma(synt)} \tag{1}$$

where E(synt) and σ(synt) are the mean and standard deviation of the whole modeled synthetic data, respectively. Similarly, each time sample seis of the observed seismic data is normalized to $d_{seis}*$ as follows:

$$d_{seis}^* = \frac{d_{seis} - E(seis)}{\sigma(seis)} \qquad (2)$$

where E(seis) and σ(seis) are the mean and standard deviation of the whole observed seismic data, respectively. Other methods of scaling (min-max, mean, unit length, etc.) may alternatively be employed in normalization.

A feature image is then generated for each shot based on the phase and amplitude differences calculated at 502 and 503 respectively, using the scalar product $d_{synt}^* * d_{seis}^*$ and absolute difference $|d_{synt}^* - d_{seis}^*|$ of the normalized data. Based on these calculations, at 504, an output sample (i.e., pixel) is flagged (with 1) as prone to cycle skipping when the amplitude difference is larger than a pre-defined threshold and there is a phase reversal:

$$\text{if } (d_{synt}^* d_{seis}^* < 0) \text{ and } (|d_{synt}^* - d_{seis}^*| > \text{threshold}) \text{ then} \qquad (3)$$

$$\text{output\_feature} = 1, \text{ else output\_feature} = 0.$$

Discrete flag values of 1 or 0 yield a crisp feature, and therefore increase the effectiveness of the clustering algorithm. In FIG. 4, if the absolute amplitude difference between the modeled and observed data is larger than a threshold (e.g., 2), the pixel is assigned a value 1 (highlighted). When there is no mismatch or the mismatch is small (e.g., an amplitude difference smaller than 2), the output pixel is assigned as 0. Similar with FIG. 3, the horizontal axis is offset (1-480 channels for each shot from left to right) and the vertical axis is time (ms).

Returning yet again to FIG. 1, cycle skip clustering is performed at 106 using UML. The UML clusters the feature images into k clusters using a k-means clustering algorithm that groups n observations (in this case n feature images corresponding to the number of shots in the data) into k clusters, each observation belongs to the cluster with the nearest mean (i.e., cluster centroid). k-means clustering is a method originally from signal processing (as described, for example, in the article "Lease Square Quantization in PCM" by Stuart P. Lloyd published in *IEEE Transactions on Information Theory*, Vol. 28, No. 2, pp. 129-137) that aims to partition n observations into k clusters in which each observation belongs to the cluster with the nearest mean (cluster centers or cluster centroid), serving as a prototype of the cluster.

The k-means clustering algorithm receives as input a number of cluster k, and the observations to be clustered (here, the feature images) and outputs a list of k cluster centroids and a map of centroid-associated clusters (known as a "class map") as described, for example, in the 1966 article "Some methods for Classification and analysis of multivariate observations" by J. MacQueen, published in Proceedings of 5th Berkeley Symposium of Mathematical Statistics and Probability, Vol. 1, pp. 281-297. FIGS. 6-9 illustrate skipping classes/centroids for k=4. All samples (whereas each sample is the mismatch image at each shot gather) that share similar features are categorized into one of these four classes. Each centroid is the average representation of all samples in that class. In this example, the k-means clustering algorithm found four classes from the data, corresponding to the following scenarios: no mismatch or non-cycle-skipping as in FIG. 6, shallow mismatch at near offset FIG. 7, deep/late mismatch at far offset FIG. 8, and mismatch at both near- and far-offset FIG. 9. The distribution of these classes on a map may indicate the transition between different cycle skipping types (e.g., laterally from no cycle skipping to near offset cycle skipping to both near- and far-offset cycle skipping, etc.).

Figure 10:
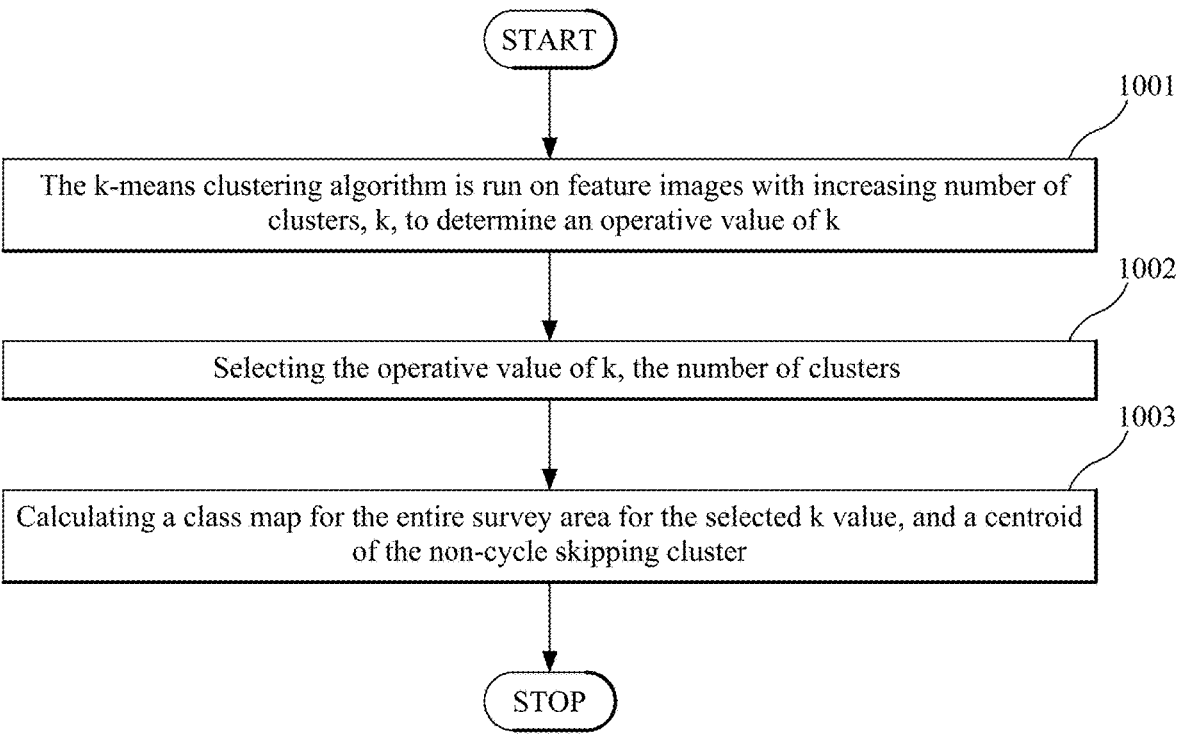
FIG. 10 is an embodiment of cycle skip clustering according to an embodiment.

An embodiment of step 106 is illustrated in FIG. 10. At 1001, the k-means clustering algorithm is run with increasing values of k. The objective is to determine a k at which (1) the non-cycle skipping class centroid is detected and (2) other centroids are meaningful to describe geological features and/or wave-field features.

Selecting an operative value of k may be achieved automatically using a Cohesion metric (referred as within-cluster variance) at 1002. For each k, the squared Euclidian distance of all feature images from their own cluster centroid are calculated and summed. As each sample is categorized into the closest centroid which represents the mismatch feature in the sample, the "Euclidian distance to cluster centroid owner" of a sample is the squared root of the square of the pixel-based difference between that image and its corresponding centroid image. For example, in the 4-means clustering results in FIGS. 6-9, assuming there are n shot gathers, each shot is symbolized as i (i=1:n) and is clusterized into its centroid $k_i$ (k=1:4). The number of samples that fall into a centroid k is mk. The amplitude at depth d and offset o of the ith mismatch image is $a_{i(d,o)}$. The amplitude at depth d and offset o of a centroid image k is $a_{k(d,o)}$. The Euclidian distance of each sample i to its centroid $k_i$ is calculated as:

$$d_{i,k_i} = \sum_{d,o} \left[ a_{i(d,o)} - a_{k_i(d,o)} \right]^2 \qquad (4)$$

The within-cluster variance of each cluster k (k=1:4) is then:

$$\sigma_k = \sqrt{\sum_{i=1}^{m_k} d_{i,k_i}|_{k_i=k}} \qquad (5)$$

and the total within-cluster variance is:

$$\sum_{k=1}^{4} \sigma_k. \qquad (6)$$

The more classes (increasing k) the smaller becomes the total within-cluster variance (i.e., a cumulative rate of variance of feature images in clusters relative to respective cluster centroids). After an optimum k (which describes the true distribution of the data) is reached, increasing k yields a slower decrease of total within-cluster variance (in the extreme case when k is equal to the number of samples, each sample itself represents one cluster and its centroid makes the sum zero). A plot of the total within-cluster variance versus k reveals the optimum k which is where the slope of the plot visibly flattens out (known as an "elbow" criterion).

In large-scale QC projects where the data has a wide variety of characteristic distributions. If the (mostly) non-cycle skipping shots are not popular enough, the clustering algorithm may be unable to group such feature images in a non-cycle skipped cluster with the optimum k. In this case, k is further increased until at least a non-cycle skipping cluster is found. The increased value of k is then the operative value; if the non-cycle skipped cluster is present at optimum k then optimum k is the operative value. The centroid of the non-cycle skipping cluster is used to calculate the cycle-skipping risk map at 108.

If no non-cycle skipped cluster is found simply because the candidate velocity model has very low quality (e.g., the initial velocity before first applying FWI), the non-cycle skipping cluster can be generated by calculating empty synthetic shots. After running optimum k-means clustering, the number of cycle skipping classes in the data is k minus 1 (excluding the synthetic cluster).

A non-skipping cluster does not necessarily mean no output_feature=1 pixel in feature images but may require the total number and density of such pixels to be below predetermined thresholds. Alternatively, simulated shots may be added to be used as references (i.e., yielding perfect clean feature images pertaining to a non-cycle skipping cluster as already mentioned).

Figure 11:
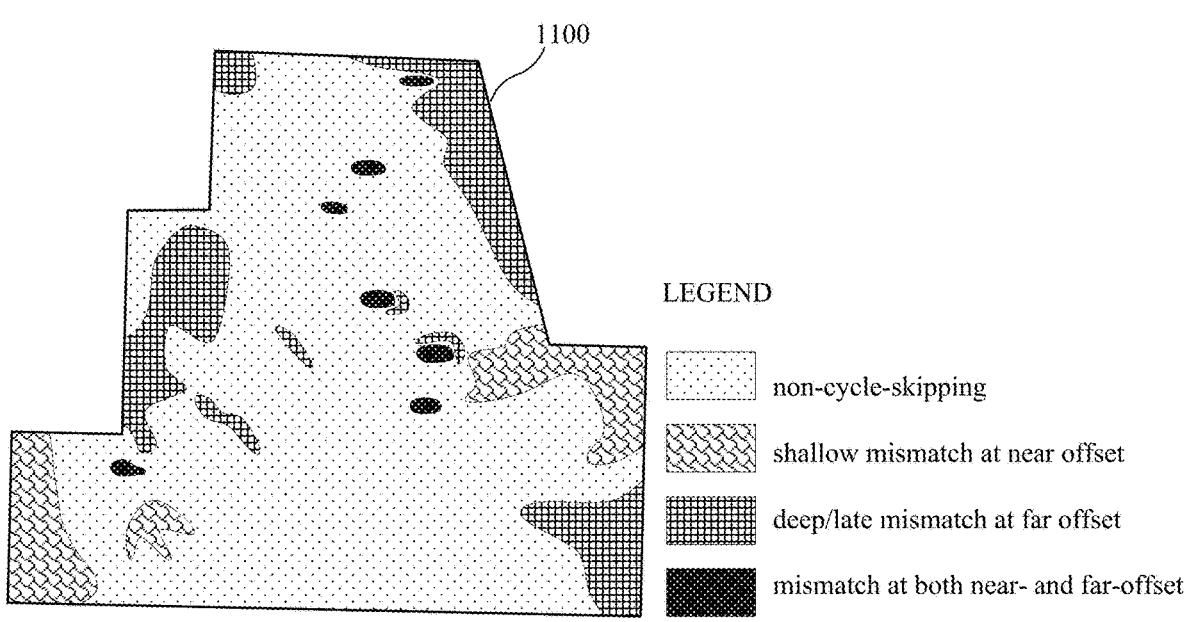
FIG. 11 illustrates a class map.

In step 1003, a class map for the entire survey area is calculated for the selected k value, and a centroid of a non-cycle skipping cluster is determined. FIG. 11 illustrates a class map where 1100 is the surveyed area. The centroid of the non-cycle skipping cluster is used later to calculate the cycle-skipping risk map. Both the class map and the cycle-skipping risk map are used for a comprehensive cycle skipping QC of the candidate velocity model.

Finally, returning yet again to FIG. 1, at 108, a cycle-skipping risk map is generated based on differences between the feature images associated with the shots and the centroid of the non-cycle skipping cluster. In agreement with the within-cluster variance method mentioned above, the Euclidian distance of each sample in a cluster i (with i=1,4) to the centroid of the non-cycle-skipping cluster k* is:

$$d_{i,k^*} = \sum\nolimits_{d,o} [a_{i(d,o)} - a_{k^*(d,o)}]^2. \tag{7}$$

This distance provides a quantitative measure of how much a shot associated with a feature image differs from a non-cycle skipped shot, that is, how inaccurate the candidate velocity model is for the area probed by the shot.

Figure 12:
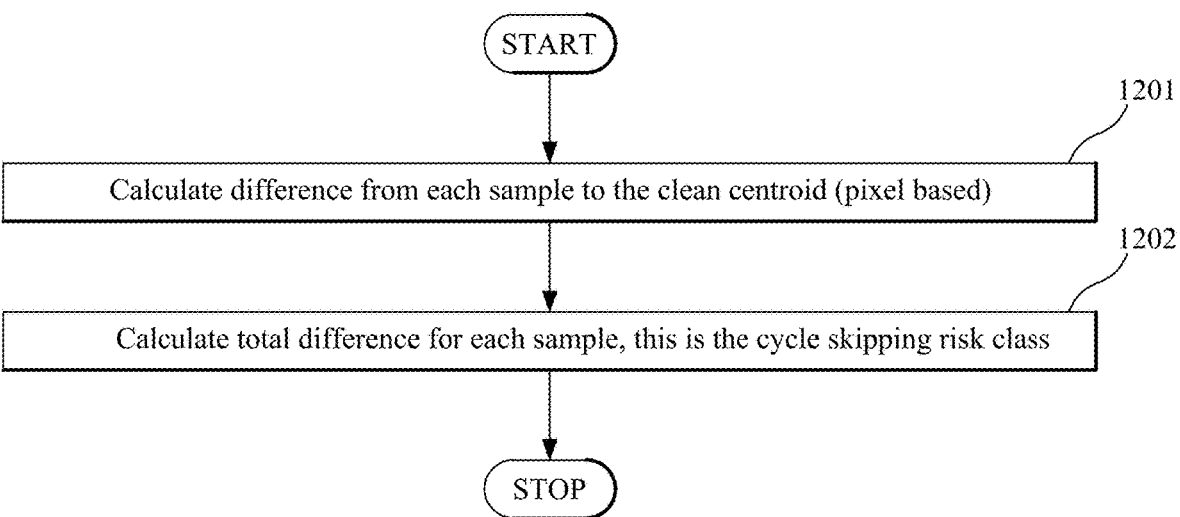
FIG. 12 illustrates generating a cycle skipping map according to an embodiment.

An embodiment of step 108 is illustrated in FIG. 12. The difference between feature images and the centroid of the non-cycle skipping (known as "distance to centroid") is calculated at 1201. These distances indicate the candidate velocity model's quality for the shot-illuminated area (thus associated with a horizontal location within a surveyed area, e.g., the source location). If a data recorded after a shot is likely not cycle-skipped (or it is just slightly cycle-skipped), the feature image corresponding to the shot is relatively clean (i.e., has close to the number and density of non-zero pixels used to define a non-cycle skipped feature image) and its distance to the centroid of the non-cycle skipped class is small, and vice-versa. The cycle-skipping risk map represents the distances from all the shots thereby providing a quality assessment relative to cycle-skipping over the entire survey area.

After a pixel-based difference image representing difference between the feature image of a shot and a centroid of the non-cycle skip class is calculated at 1201, then a single sum of all samples (i.e., pixels) in the difference image is computed for each location at 1202, yielding the cycle-skipping risk map. In other words, after this step, each shot has its own score (i.e., the result of difference summation), which represents how dissimilar it is from a non-cycle skipped shot. Both cycle-skipping risk map and class map characterize the FWI results. The maps reflect cycle skipping quality of the underlying velocity models so the model improvement can be observed by comparing corresponding maps before and after FWI is applied to update the velocity model.

The cycle-skipping risk maps between different FWI updates may be standardized for coherent comparison. The data becomes less cycle skipped after each FWI update, and this improvement yields smaller values in the cycle-skipping risk map, as well as more non-cycle skipped feature images in the class map.

Centroids of classes may change from one FWI iteration to the next because the mismatch characteristics are changed. Centroids of similar classes may be located and correlated in successive analyses. The trend is to find fewer classes after each FWI update because some initial cycle skip types are fixed during the update.

If FWI uses constraints integrating (e.g., as constraints) other information (e.g., well logs, geological information) besides the observed seismic data, then the causes of cycle skipping may be eliminated ('identified') faster.

Figure 13:
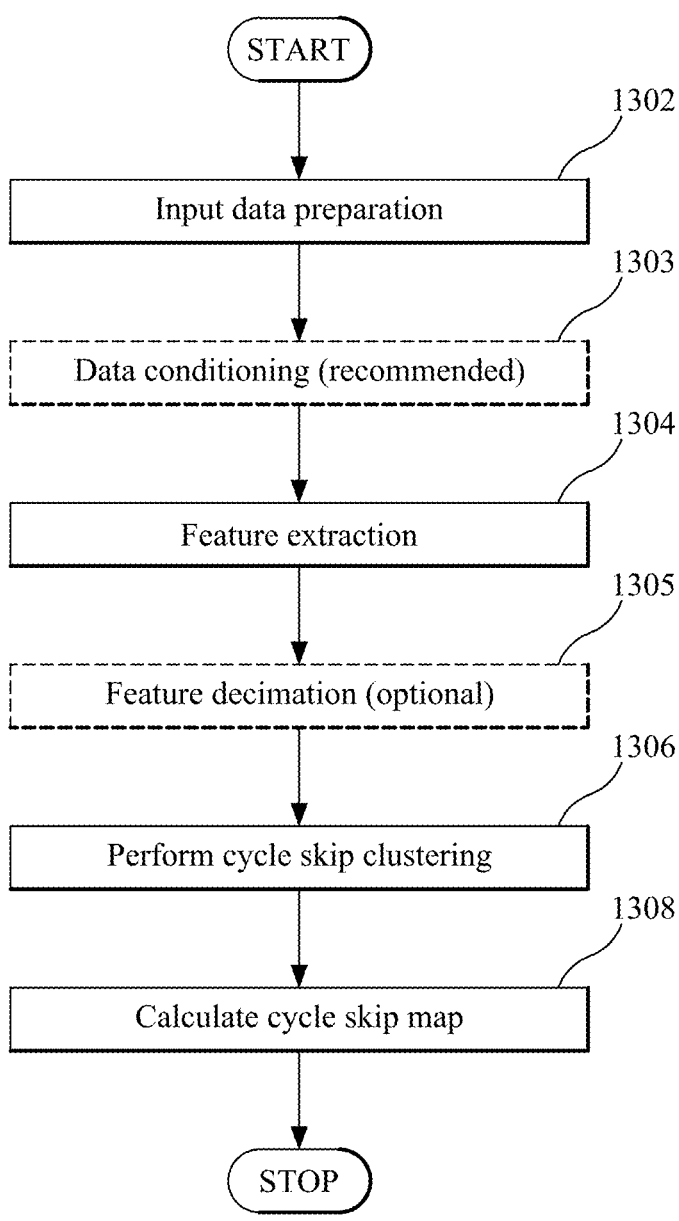
FIG. 13 is a flowchart of a method for quality control of FWI according to another embodiment.

FIG. 13 illustrates a flow diagram of a method 1300 for quality analysis of an FWI-related model according to another embodiment. Steps 1302, 1304, 1306 and 1308 are similar to steps 102, 104, 106 and 108 of method 100. Method 1300 further includes steps 1303 and 1305. However, one embodiment may include only step 1303 in addition to steps 1302, 1304, 1306 and 1308, while another embodiment may include only step 1305 in addition to steps 1302, 1304, 1306 and 1308.

Figure 14:
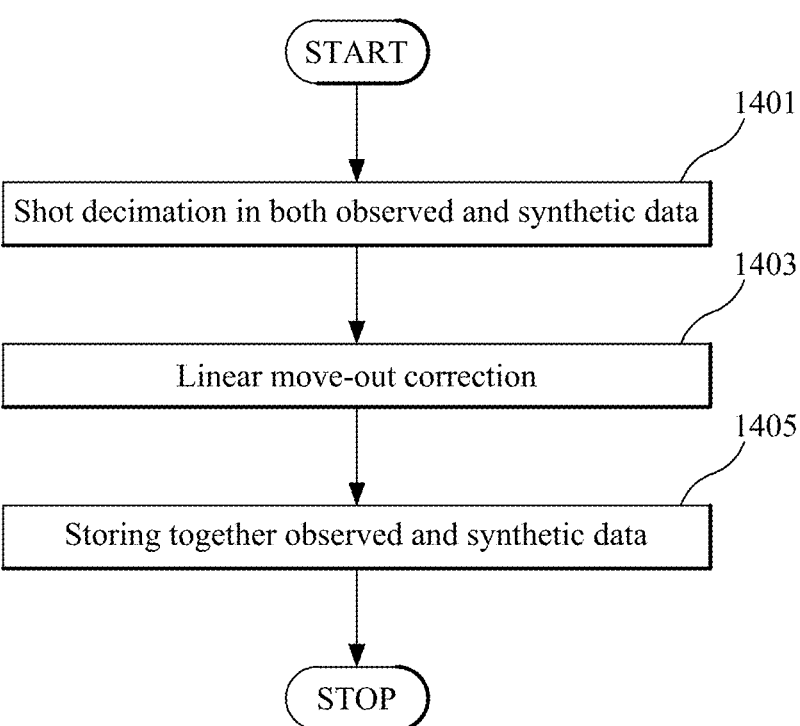
FIG. 14 illustrates implementation of a data conditioning step according to an embodiment.

Depending on data type and required output, data conditioning may be required at 1303. This step is optional but recommended to transform the data into a new domain, thereby facilitating analysis and to avoid potential artifacts in later processing. FIG. 14 illustrates an embodiment of step 1303. The data is first decimated by shot to reduce its size at 1401. With FWI, mismatch at high dip can be difficult to visualize, and aliasing may occur in later processing after trace decimation. Therefore, a linear move-out correction may be applied to mitigate these issues at 1403. When dealing with a large amount of data or a large area, a constant single water velocity is used in the linear move-out correction for simplicity and consistency. The offset-related dependency is not fully corrected, but sufficient flatness is achieved for cycle skipping analysis. Steps 1401 and 1403 are applied to both observed and simulated data that are then stored together at 1405.

Step 1305 is another optional step, data decimation, performed here on each feature images. Data decimation reduces the size of the data input to the machine learning clustering algorithm and therefore decreases its runtime. The feature image decimation may be a trace-based operation. The trace selection should be as sparse as possible (e.g., one of every 2, 3 or more traces) yet small enough to avoid spatial aliasing. This decimation may be coordinated with the data conditioning performed at 1203. The real-world seismic acquisition configuration normally includes, for example, 2 air guns and 6 streamers/cables, each cable being divided in 480 channels. Data decimation may use 1 gun, 1 cable, and then decimate the channels as previously described. Using 1 gun, 1 cable yields a very small regional structure changes observed between guns (which typically fire at a 18.75 m interval) and cables (which are 100 m separation). The difference in channel direction is significant because the cables are 6 km long, when decimated considering one trace out of 2-3 traces.

Figure 15:
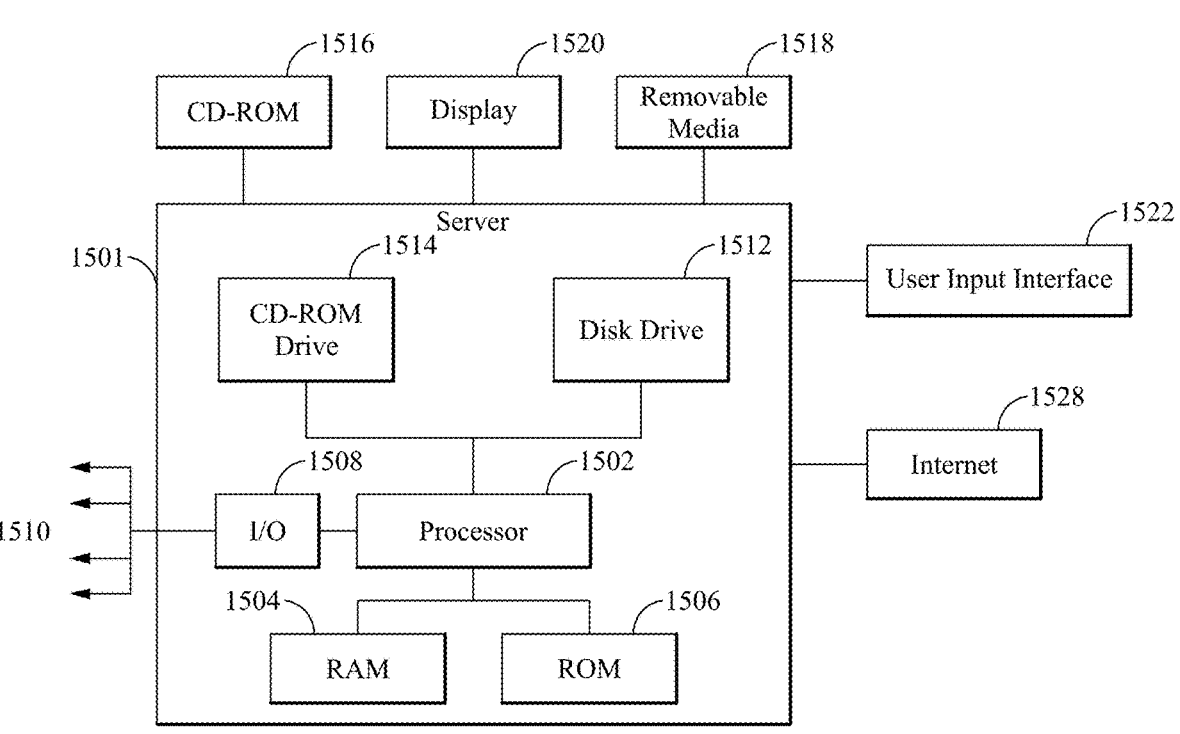
FIG. 15 is a schematic diagram of a data processing apparatus according to an embodiment.

The above-discussed methods may be implemented in a computing device 1500 as illustrated in FIG. 15. Hardware, firmware, software or a combination thereof may be used to perform the various steps and operations described herein.

Exemplary computing device 1500 suitable for performing the activities described in the exemplary embodiments may include a server 1501. Server 1501 may include a central processor (CPU) 1502 coupled to a random access memory (RAM) 1504 and to a read-only memory (ROM) 1506. ROM 1506 may also be other types of storage media to store programs, such as programmable ROM (PROM), erasable PROM (EPROM), etc. Processor 1502 may communicate with other internal and external components through input/output (I/O) circuitry 1508 and bussing 1510 to provide control signals and the like. Processor 1502 carries out a variety of functions as are known in the art, as dictated by software and/or firmware instructions.

Server 1501 may also include one or more data storage devices, including hard drives 1512, CD-ROM drives 1514 and other hardware capable of reading and/or storing information, such as DVD, etc. In one embodiment, software for carrying out the above-discussed steps may be stored and distributed on a CD-ROM or DVD 1516, a USB storage device 1518 or other form of media capable of portably storing information. These storage media may be inserted into, and read by, devices such as CD-ROM drive 1514, disk drive 1512, etc. Server 1501 may be coupled to a display 1520, which may be any type of known display or presentation screen, such as LCD, plasma display, cathode ray tube (CRT), etc. A user input interface 1522 is provided, including one or more user interface mechanisms such as a mouse, keyboard, microphone, touchpad, touch screen, voice-recognition system, etc.

Server 1501 may be coupled to other devices, such as sources, detectors, etc. The server may be part of a larger network configuration as in a global area network (GAN) such as the Internet 1528, which allows ultimate connection to various computing devices.

The embodiments described in this section provide methods and apparatuses for quality control of candidate velocity models used or updated in FWI. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A seismic data processing method for improving a velocity model of a subsurface formation by mitigating cycle skipping, the method comprising:

obtaining observed seismic data acquired over the subsurface formation, and corresponding synthetic seismic data prepared by a processor using a candidate velocity model of the subsurface formation;

generating feature images by calculating phase differences and amplitude differences between normalized samples of the observed seismic data and the corresponding synthetic seismic data, wherein pixels are flagged as cycle skipped when an amplitude difference exceeds a threshold and a phase reversal is detected;

applying by the processor a k-means clustering algorithm to the feature images to generate a class map comprising k clusters and corresponding centroids thereof, wherein the k clusters include a non-cycle skipped cluster representing reference seismic behavior;

generating a cycle-skipping risk map by calculating pixel-based differences between the feature images and a centroid of the non-cycle skipped cluster;

updating the candidate velocity model by performing a full waveform inversion constrained by the cycle-skipping risk map to reduce cycle skipping in identified subsurface regions; and recomputing synthetic seismic wavefields using the updated velocity model to generate a physical representation of the subsurface formation for hydrocarbon exploration.

2. The method of claim 1, wherein the class map and the cycle-skipping risk map are used to guide the candidate velocity model update in the FWI.

3. The method of claim 1, further comprising comparing an updated cycle-skipping quality based on the candidate velocity model as updated by the FWI, with a cycle-skipping quality representing the cycle-skipping risk map.

4. The method of claim 1, wherein the feature images comprise flagged and unflagged pixels.

5. The method of claim 1, wherein the applying of the k-means clustering algorithm to the feature images includes determining an operative number of classes k.

6. The method of claim 5, wherein the operative number of classes k is determined based on a slope of a cumulative rate of variance of feature images in clusters relative to respective cluster centroids as a function of k.

7. The method of claim 6, wherein the operative number of classes k is increased if no non-cycle skipping class is present among k classes.

8. The method of claim 1, wherein the generating of the cycle-skipping risk map includes:

calculating a difference image representing pixel-based difference of each feature image to a centroid of a non-cycle skipping class; and calculating a total sum of all pixels in each difference image.

9. The method of claim 1, further comprising at least one of shot decimation and feature images decimation.

10. The method of claim 1, wherein the subsurface formation is under water floor and the method further comprises applying a linear move-out correction to both the observed seismic data and the synthetic data before generating of the feature images.

11. A seismic data processing apparatus configured to improve a velocity model of a subsurface formation by mitigating cycle skipping, the apparatus comprising:

an interface configured to obtain observed seismic data acquired over the subsurface formation; and a processor connected to the interface and configured:

to prepare synthetic seismic data corresponding to the observed seismic data, using a candidate velocity model of the subsurface formation;

to generate feature images by calculating phase differences and amplitude differences between normalized samples of the observed seismic data and the corresponding synthetic seismic data, wherein pixels are flagged as cycle skipped when an amplitude difference exceeds a threshold and a phase reversal is detected;

to apply a k-means clustering algorithm to the feature images and to generate a class map comprising k clusters and corresponding centroids thereof, wherein the k clusters include a non-cycle skipped cluster representing reference seismic behavior;

to generate a cycle-skipping risk map by calculating pixel-based differences between the feature images and a centroid of the non-cycle skipped cluster;

to update the candidate velocity model by performing a full waveform inversion constrained by the cycle-skipping risk map to reduce cycle skipping in identified subsurface regions; and to recompute synthetic seismic wavefields using the updated velocity model to generate a physical representation of the subsurface formation for hydrocarbon exploration.

12. The seismic data processing apparatus of claim 11, wherein the class map and the cycle-skipping risk map are used to guide the candidate velocity model update in an iteration of the FWI, and the processor is further configured to compare an updated cycle-skipping quality of the candidate velocity model as updated by the FWI, with a cycle-skipping quality representing the cycle-skipping risk map.

13. The seismic data processing apparatus of claim 11, wherein the processor determines an operative number of classes k by identifying an elbow point in a distribution of within-cluster variance, wherein the elbow point is determined based on a change in a rate of decrease of the cumulative rate of variance of feature images relative to increasing values of k.

14. The seismic data processing apparatus of claim 13, wherein the processor increases the operative number of classes k if no non-cycle skipping class is present among k classes.

15. The seismic data processing apparatus of claim 11, wherein the processor generates the cycle-skipping risk map by:

calculating a difference image representing difference of each feature image to a centroid of a non-cycle skipping class; and calculating a total sum of all pixels in each feature image.

16. The seismic data processing apparatus of claim 11, wherein the processor is further configured to perform at least one of shot decimation and feature images decimation.

17. The seismic data processing apparatus of claim 11, wherein the subsurface formation is under water floor and the processor is further configured to apply a linear moveout correction to both the observed seismic data and the synthetic data before generating the feature images.

* * * * *